(12) United States Patent
West et al.

(10) Patent No.: US 12,269,069 B2
(45) Date of Patent: Apr. 8, 2025

(54) MAT WASHING SYSTEM

(71) Applicant: Northern Mat & Bridge (Gp) Ltd., Calgary (CA)

(72) Inventors: Sam West, Houston (CA); Ryan Dusterhoft, Grand Prairie (CA); Heith Johnson, Clairmont (CA); Douglas A. Hunter, Calgary (CA); Dennis Needham, Calgary (CA); Gerald Mychajlyszyn, Calgary (CA); Clifford Cameron, Calgary (CA); Daniel Kusler, Foothills (CA)

(73) Assignee: Northern Mat & Bridge (Gp) Ltd., Calgary (CA)

( * ) Notice: Subject to any disclaimer, the term of this patent is extended or adjusted under 35 U.S.C. 154(b) by 0 days.

(21) Appl. No.: 17/771,402

(22) PCT Filed: Oct. 25, 2019

(86) PCT No.: PCT/CA2019/000153
§ 371 (c)(1),
(2) Date: Apr. 22, 2022

(87) PCT Pub. No.: WO2021/077195
PCT Pub. Date: Apr. 29, 2021

(65) Prior Publication Data
US 2022/0388037 A1 Dec. 8, 2022

(51) Int. Cl.
*B08B 3/02* (2006.01)
*B01D 39/08* (2006.01)
(Continued)

(52) U.S. Cl.
CPC .............. *B08B 3/022* (2013.01); *B01D 39/08* (2013.01); *B08B 3/041* (2013.01); *B08B 3/08* (2013.01);
(Continued)

(58) Field of Classification Search
CPC .......... D06G 1/00; B08B 3/022; B08B 3/041; B08B 3/123
See application file for complete search history.

(56) References Cited

U.S. PATENT DOCUMENTS 3,881,209 A 5/1975 Reinitz et al.
4,103,389 A 8/1978 Resnick et al.
(Continued)

FOREIGN PATENT DOCUMENTS

CA 1178407 A 11/1984
CA 2770316 A1 2/2011
(Continued)

*Primary Examiner* — Omair Chaudhri
(74) *Attorney, Agent, or Firm* — The Webb Law Firm

(57) ABSTRACT

A brushless system for washing a large flat object having a length greater than a width, the width defining a cross-section, said system including a frame defining a longitudinal path and including a first end; a second end; and a wash chamber positioned between said first and second ends. A transport system secured to the frame and adapted to transport said object positioned thereon; said transport system including a plurality of idle rollers located along said longitudinal path and adapted to support said object as it travels along the longitudinal path; a drive system to provide mechanical transport motion to said object along the longitudinal path from said first end of the frame to said second end of the frame, said drive system being positioned outside the wash chamber; and first end including a loading mechanism to position the object on at least one of the plurality of rollers, and said second end including an unloading mechanism to remove the object from at least one of the plurality of rollers; said wash chamber including an entrance located proximate the first end and an exit located proximate the second end, and a series of high pressure water jets positioned within the wash chamber and adapted to spray the entire surface of said object when such transits through the (Continued)

washing chamber. The entire cross-section of said object is untouched by the system at at least one point during its transit through the wash chamber.

27 Claims, 12 Drawing Sheets

(51) Int. Cl.
  *B08B 3/04* (2006.01)
  *B08B 3/08* (2006.01)
  *B08B 3/14* (2006.01)
  *B08B 13/00* (2006.01)
  *C02F 1/00* (2023.01)

(52) U.S. Cl.
  CPC ............... *B08B 3/14* (2013.01); *B08B 13/00* (2013.01); *C02F 1/001* (2013.01); *C02F 2001/007* (2013.01)

(56) References Cited

U.S. PATENT DOCUMENTS

| | | | | |
|---|---|---|---|---|
| 4,268,929 | A * | 5/1981 | Sorensen | D06G 1/00 |
| | | | | 15/345 |
| 4,368,627 | A | 1/1983 | Bode, Sr. et al. | |
| 4,453,386 | A * | 6/1984 | Wilkins | D06F 31/00 |
| | | | | 68/196 |
| 4,821,754 | A * | 4/1989 | Weil | B27L 5/00 |
| | | | | 134/122 R |
| 4,926,520 | A * | 5/1990 | Watson | D06G 1/00 |
| | | | | 15/302 |
| 6,129,099 | A | 10/2000 | Foster et al. | |
| 8,273,183 | B2 | 9/2012 | Elrich et al. | |
| 8,273,186 | B2 | 9/2012 | Rubenzer et al. | |
| 8,277,566 | B2 | 10/2012 | Rubenzer et al. | |
| 2002/0154180 | A1 | 10/2002 | Uchikata | |
| 2007/0012340 | A1 * | 1/2007 | Jones | A61L 2/10 |
| | | | | 134/131 |
| 2010/0051058 | A1 | 3/2010 | Cotter et al. | |
| 2011/0017245 | A1 * | 1/2011 | Vernon | B08B 3/022 |
| | | | | 134/122 R |
| 2011/0095205 | A1 * | 4/2011 | Noto | B08B 7/00 |
| | | | | 250/492.1 |
| 2012/0137908 | A1 * | 6/2012 | Teng | G03F 7/38 |
| | | | | 101/463.1 |
| 2012/0325268 | A1 | 12/2012 | Rubenzer et al. | |
| 2014/0014143 | A1 * | 1/2014 | Kennedy | B08B 1/002 |
| | | | | 134/115 R |
| 2014/0020723 | A1 * | 1/2014 | Murphy | B08B 3/022 |
| | | | | 134/104.2 |
| 2015/0107633 | A1 * | 4/2015 | Hartwell | B08B 1/02 |
| | | | | 134/122 R |
| 2016/0375468 | A1 * | 12/2016 | Perrier | B08B 1/02 |
| | | | | 15/77 |
| 2017/0036248 | A1 * | 2/2017 | Gross | B08B 3/022 |
| 2017/0259307 | A1 * | 9/2017 | Francis | B08B 3/022 |
| 2018/0155866 | A1 * | 6/2018 | Brennan | B08B 7/04 |
| 2020/0224379 | A1 * | 7/2020 | Knapp | B08B 3/022 |
| 2021/0007386 | A1 * | 1/2021 | Song | A23N 12/005 |

FOREIGN PATENT DOCUMENTS

| | | |
|---|---|---|
| CA | 2817935 A1 | 8/2013 |
| CA | 2911836 A1 | 1/2016 |
| CA | 2871376 A1 | 5/2016 |
| CA | 3012208 C | 1/2021 |
| JP | H929989 A | 2/1997 |
| JP | H10295973 A | 11/1998 |
| JP | 200425125 A | 1/2004 |

* cited by examiner

MAT WASHING SYSTEM

CROSS-REFERENCE TO RELATED APPLICATION

This application is the United States national phase of International Application No. PCT/CA2019/000153 filed Oct. 25, 2019, the disclosure of which is hereby incorporated by reference in its entirety.

BACKGROUND OF THE INVENTION

Field of the Invention

The present invention is generally directed to an industrial washing system for washing large flat objects, more specifically for non-contact washing of large mats also referred to as road or access mats.

Description of Related Art

In order to facilitate transport and movement of heavy vehicles in construction areas and remote mining or oil and gas worksites, it is often desirable to have access roads or worksites covered with road mats also referred to as access mats. These allow vehicles to circulate on very difficult unpaved roads by reducing or even completely eliminating the risk of getting bogged down in mud. These mats are laid right over access roads to help the circulation of heavy equipment such as trucks, cranes and other heavy machinery. However, over time, the mats get covered in dirt and must be washed prior to being moved to another work site or being re-used. Manual washing of these mats is extremely time consuming and is a very inefficient process. The sheer number of mats to be washed is a barrier to washing such mats purely by human activity as it would become economically undesirable to do so.

Known devices for washing swamp mats, such as the one disclosed in U.S. Pat. No. 8,273,186, have a conveying system to transport the mats through the device on rollers. A multiplicity of powered conveyor rollers expose the system to the possibility of breakdowns as the dirt, dust may accumulate on the rollers and diminish their ability to operate optimally which can possibly results in delays and cost overruns. Because the mats are made of horizontal and vertical boards, the boards may tend to jam in the slots between the rollers of the conveyor system.

Northern Mats' Canadian Patent CA 2,871,376 discloses a system for washing a large flat object having a length and a width, wherein the length is of greater dimension than said width, said system comprising: a frame having a first and second end; a transport system adapted to vertically transport said large flat object suspended thereon; said transport system defining a horizontal axis along the device and adapted to transport said object from the first end of the frame to the second end of the frame; and at least one brushing means for brushing and removing particles lodged on said object; said at least one brushing means located along the transport system between the first and second end of the frame and adapted to frictionally engage said object when in operation. A drawback that was noted during operation of the system was that in order to wash the entire surface of the mats, the mat would go through a first wash cycle and then be unloaded from the transport system and then undergo a second wash in order to ensure complete washing of the exposed surfaces of the objects or mats.

In light of the prior art, there is clearly still a need for a mat washing system which overcomes the drawbacks of the prior art. Generally speaking, two issues that the inventors targeted in their design of a novel system were those of reliability and efficiency of the mat washing operation. The present invention is directed to an industrial washing device, more specifically to a device for washing mats, where the washing operation is controlled for the most part by a computerized control system.

Consequently, there still remains a need for a reliable device which provides a method of washing mats which overcomes certain drawbacks of prior art devices.

SUMMARY OF THE INVENTION

Accordingly, the present invention is generally directed to an industrial washing system, more specifically to a system for washing mats. According to one aspect of the present invention, there is provided a system for washing a large flat object having a length greater than a width, the width defining a cross-section, said system comprising:
  a frame defining a longitudinal path and comprising
    a first end;
    a second end; and
    a wash chamber positioned between said first and second ends;
  a transport system secured to the frame and adapted to transport said object positioned thereon; said transport system comprising:
    a plurality of idle rollers located along said longitudinal path and adapted to support said object as it travels along the longitudinal path; and
    a drive system to provide mechanical transport motion to said object along the longitudinal path from said first end of the frame to said second end of the frame, said drive system being positioned outside the wash chamber; and
    first end comprising a loading mechanism to position the object on at least one of the plurality of rollers, and said second end comprising an unloading mechanism to remove the object from at least one of the plurality of rollers;
  said wash chamber comprising an entrance located proximate the first end and an exit located proximate the second end, and a plurality of high pressure nozzles (water jets) positioned within the wash chamber and adapted to spray said object when such is within the washing chamber.

According to a preferred embodiment, the object is transported vertically along its edge through the brushless wash system. The object is meant to transit along the longitudinal path defined by the frame of the systems.

According to a preferred embodiment of the present invention, there is provided a brushless system for washing a large flat object having a length greater than a width, the width defining a cross-section, said system comprising:
  a frame defining a longitudinal path and comprising
    a first end;
    a second end; and
    a wash chamber positioned between said first and second ends;
  a transport system secured to the frame and adapted to transport said object positioned thereon; said transport system comprising:
    a plurality of idle rollers located along said longitudinal path and adapted to support said object as it travels along the longitudinal path;

a drive system to provide mechanical transport motion to said object along the longitudinal path from said first end of the frame to said second end of the frame, said drive system being positioned outside the wash chamber; and first end comprising a loading mechanism to position the object on at least one of the plurality of rollers, and said second end comprising an unloading mechanism to remove the object from at least one of the plurality of rollers;

said wash chamber comprising an entrance located proximate the first end and an exit located proximate the second end, and a series of high pressure nozzles (water jets) positioned within the wash chamber and adapted to spray the entire surface of said object when such is within the washing chamber.

According to another preferred embodiment of the present invention, there is provided a brushless system for washing a large flat object having a length greater than a width, the width defining a cross-section, said system comprising:

a frame defining a longitudinal path and comprising
a first end;
a second end; and
a wash chamber positioned between said first and second ends;

a transport system secured to the frame and adapted to transport said object positioned thereon; said transport system comprising:

a plurality of idle rollers located along said longitudinal path and adapted to support said object as it travels along the longitudinal path;

a drive system to provide mechanical transport motion to said object along the longitudinal path from said first end of the frame to said second end of the frame, said drive system being positioned outside the wash chamber; and first end comprising a loading mechanism to position the object on at least one of the plurality of rollers, and said second end comprising an unloading mechanism to remove the object from at least one of the plurality of rollers;

said wash chamber comprising an entrance located proximate the first end and an exit located proximate the second end, and a series of high pressure nozzles (water jets) positioned within the wash chamber and adapted to spray the entire surface of said object when such transits through the washing chamber;

wherein the entire cross-section (to be understood as being the width of the object) of said object is untouched by the system at least one point during its transit through the wash chamber.

Preferably, the large flat object is positioned on its side along an edge thereof.

Preferably also, the drive system comprises a pair of opposing drive rollers adapted to frictionally engage said object and drive the object into the wash chamber. Preferably, the drive system comprises a second pair of opposing drive rollers adapted to frictionally engage said object after a portion thereof exits the wash chamber and pull the object out of the wash chamber. Preferably also, the pair of drive rollers are mounted on the frame proximate the entrance of the wash chamber. Preferably, at least one of the rollers of the pair of drive rollers is pivotally mounted on the frame to allow movement between a first position which allows room for insertion of the object onto the transport system and a second position where the two rollers are in frictional contact with the object.

Preferably, a second series of high pressure jets located within the wash chamber in a position after the series of high pressure water jets. Preferably, a third series of high pressure jets located within the wash chamber in a position after the second series of high pressure water jets.

According to another preferred embodiment of the present invention, the loading support further comprises hydraulic cylinders to move said loading support from a horizontal position to a substantially vertical position.

According to another preferred embodiment of the present invention, there is an unloading support located at the second end of the frame to receive the washed object. Preferably, the unloading support further comprises an index with a horizontally moving clamp. According to a preferred embodiment, the unloading support comprises a frame pivotally movable about an axis to move from a substantially vertical position to a substantially horizontal position.

According to another preferred embodiment of the present invention, at least one water collecting means to collect water used in washing the object. Preferably, the water collecting means is a trough located underneath the path of the object being washed and adapted to receive and collect the water dripping off the object. Preferably, the water collecting means further comprises a channel adapted to direct the collected water to a settling tank.

According to another preferred embodiment of the present invention, there is at least one water treatment means for treating the water collected by the collecting means.

According to another preferred embodiment of the present invention, the system further comprises a closed loop water recirculation system.

According to another preferred embodiment of the present invention, the system comprises a chemical spraying assembly to chemically treat the object after the washing operation, wherein said chemical spraying assembly is located proximate the exit of the wash chamber. Preferably, the system comprises a chemical recovery means separate from the water collecting means.

According to another preferred embodiment of the present invention, the separate chemical recovery means comprises a channel adapted to receive chemical containing fluid dripping off the object. Preferably, the separate chemical recovery means further comprise a chemical recovery vessel in fluid connection with said channel adapted to receive liquid dripping off the object.

Preferably, the system further comprises a tank supplying water used in the washing process which tank comprises a filtration system to remove suspended solids present in water prior to the water exiting the tank. Preferably, the filtration system comprises a geotextile fabric.

According to another aspect of the present invention, there is provided a method for contact-free washing of a mat, said method comprising:

providing a mat washing system as described above;
providing a mat;
loading said mat onto the mat washing system;
securing said mat onto the transport system by frictionally engaging opposing drive rollers to a portion of the mat;
transporting the mat through the wash chamber;
striking the entire surface area of the mat with high pressure fluid; and
retrieving the mat from the wash chamber.

BRIEF DESCRIPTION OF THE DRAWINGS

The present invention may be better understood in consideration of the following description of various embodiments of the invention in connection with the accompanying drawings, in which.

DESCRIPTION OF THE INVENTION

Figure 1:
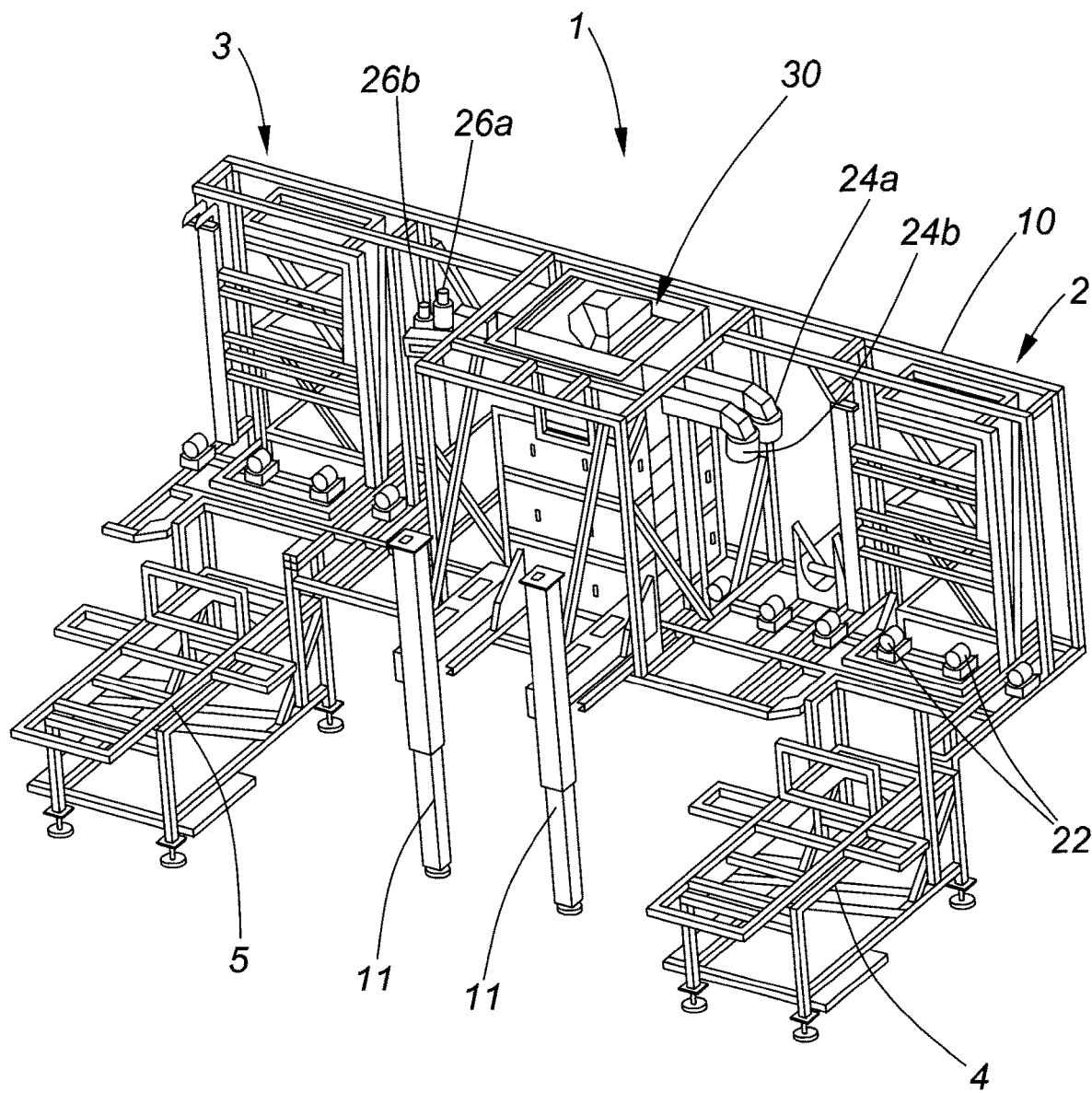
FIG. 1 is a perspective view of the mat washing system according to a preferred embodiment of the present invention.

The system for washing large flat objects, according to a preferred embodiment of the present invention, is adapted to be moved from site to site as needed by loading it onto a custom-made trailer. The trailer follows highway transportation rules and is designed (weight) to be transported during a 75% Road Ban. Known devices from other companies are understood to be stationary systems once installed.

Preferably the system further comprises a loading support located at the first end of the frame, said loading support adapted to receive a plurality of objects to be washed. More preferably, the loading support further comprises an index to separate and lift the object from said support. Preferably also, the loading support is adapted to move from a horizontal position to a vertical position. Preferably, the loading support further comprises hydraulic cylinders to move said loading support from a horizontal position to a vertical position.

The system for washing large flat objects, according to a preferred embodiment of the present invention has a single vertical transport system. Known devices have several separate horizontal conveying systems that may work together to pass the mats to each other from the front end of the device to the back end.

According to yet another aspect of the invention, the mat washing device can be completely automated utilizing a programmable logic controller (PLC). The PLC allows for the mat washing machine to operate completely on its own once the mats are placed horizontally on the infeed stacker. This is an advantage over known devices as none have integrated complete automation capabilities.

A programmable logic control system (PLC) signals the loading mechanism (40) to pick up a mat from the loading station (or infeed station) (4) and place it onto idle rollers (22). The mat is then frictionally clamped between a pair of drive rollers (24a, 24b) set on either side of the mat and adapted to push the mat into the wash chamber (30).

Known systems require additional transporting system to load and unload mats. According to a preferred embodiment of the present invention, the device for washing large flat objects has loading and unloading capabilities which may be integral to the entire system and designed to automatically work with the entire system. There are no add-ons required. The loading & unloading system is novel to the industry as the loading portion takes a mat from a horizontal position to a vertical to wash it and reverses clean mats to unload them from the system. In a preferred embodiment, the loading and unloading systems each comprise two main parts: a table and a loader (unloader). The table is adapted to receive a plurality of mats and is tiltable to allow the mats resting thereon to be positioned at an angle therefore allowing the loader to grab one mat at a time and deposit the mat in a vertical position (on its side edge) onto idle rollers located on the wash system. The loader (unloader) comprises a system of hydraulic clamps adapted to grasp the mat from its edges and move it onto the idle rollers. The design is such that the bottom part of the clamp portion can be inserted between two idle rollers and therefore allow to position the mat onto the idle rollers without dropping it or violently slamming it onto the rollers. This is desirable as it allows for a longer useful lifetime of the rollers and to a certain extent, the mats as well.

FIG. 1 shows an overview of the mat washing system (1) according to a preferred embodiment of the present invention, the main sections of the system are as follows: the first end (2), the second end (3); the loading section (4); the unloading section (5); outriggers (11); wash chamber (30); drive rollers (24a, 24b and 26a, 26b); frame (10) and idle rollers (22).

Figure 2:
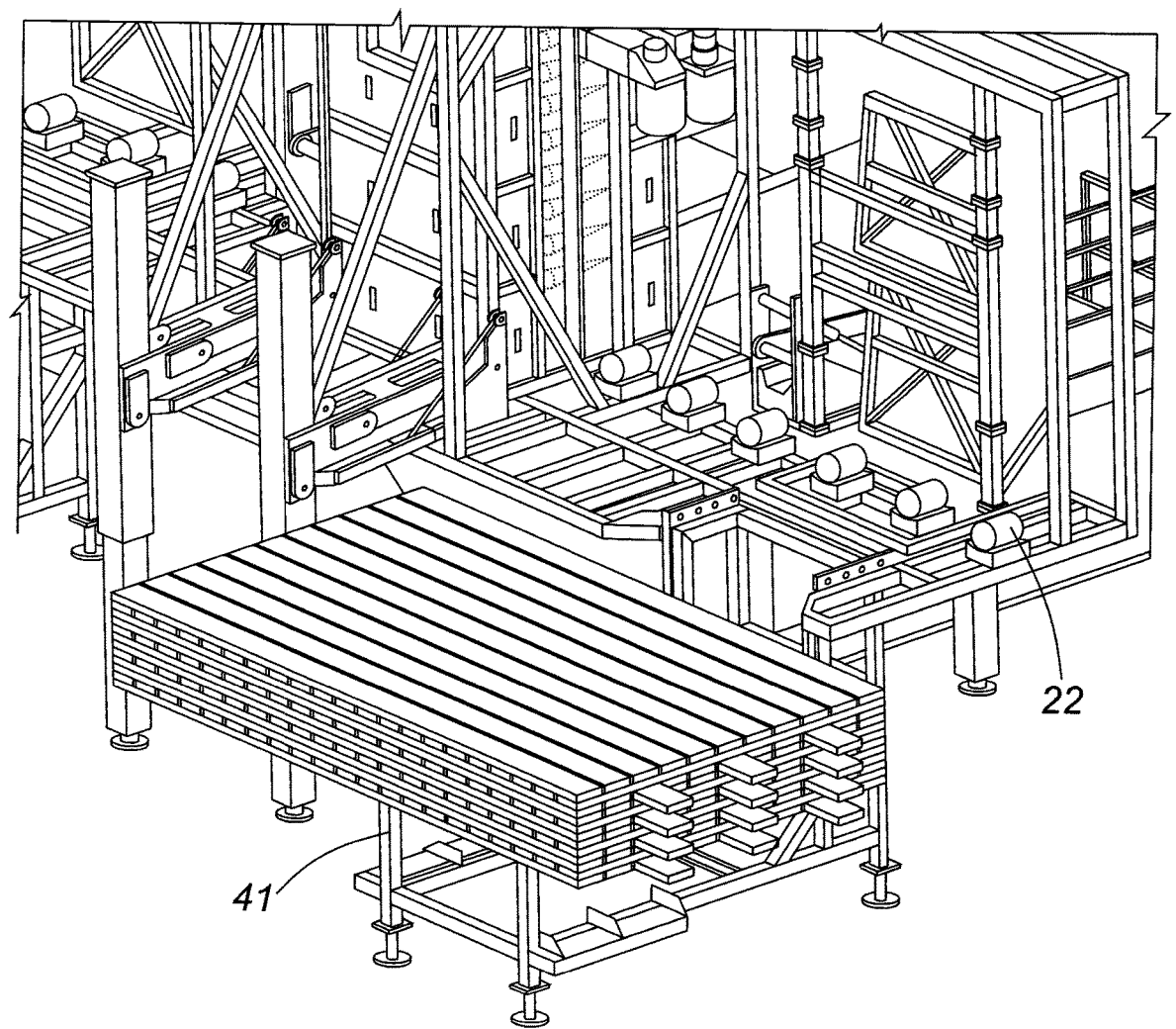
FIG. 2 is a close up perspective view of the loading section of the mat washing system according to a preferred embodiment of the present invention.
Figure 3:
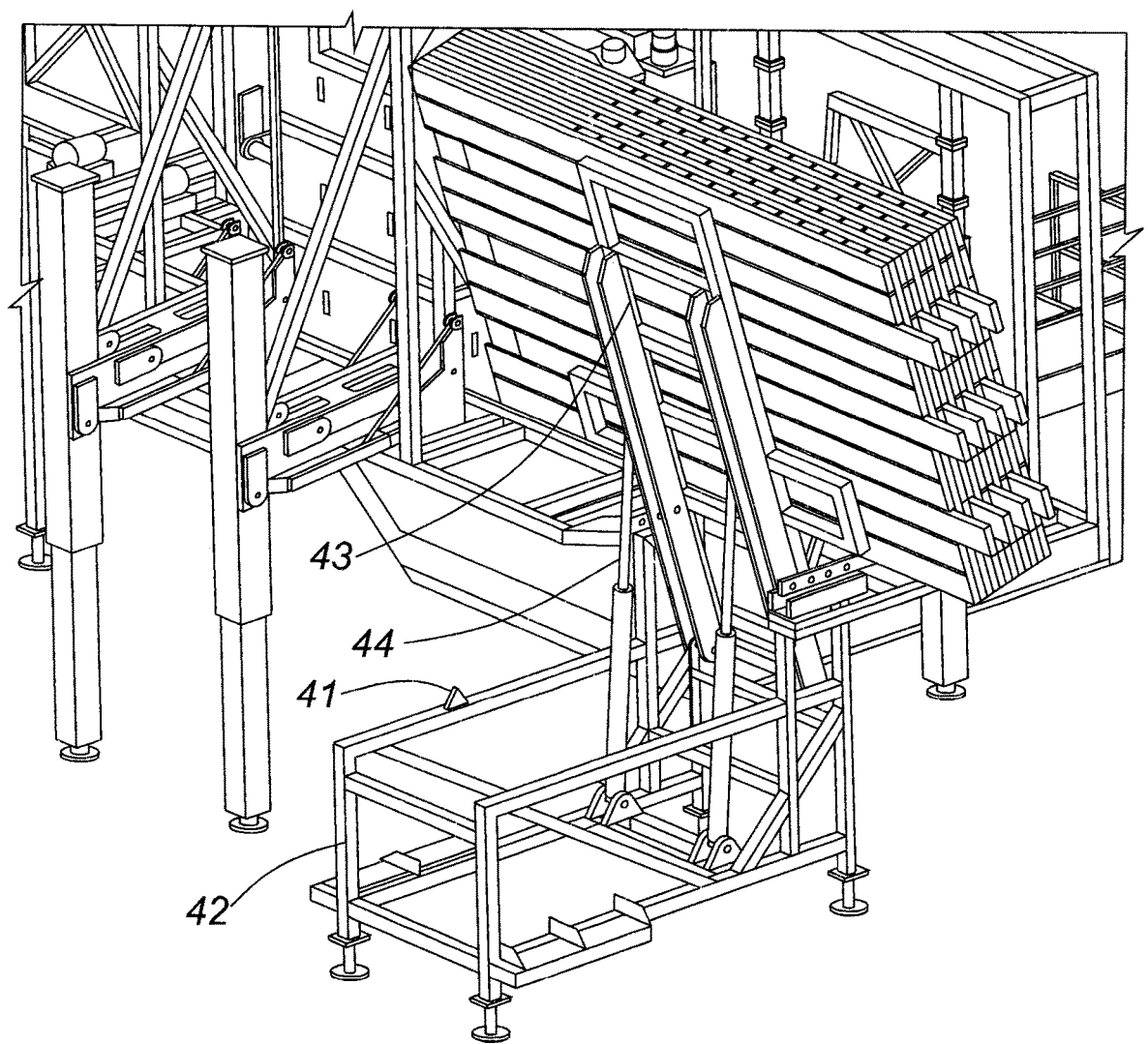
FIG. 3 is a close up perspective view of the loading section of the mat washing system according to a preferred embodiment of the present invention where the mat table is tilted up prior to the loading of a mat onto the idle rollers.

FIG. 2 is a close-up view of the mat washing system (1) with the tanks removed from view. Mats are brought in with a forklift or loader dropping a stack of 4 on the infeed table (41). The infeed table comprises a base (42), a top (43) and means of lifting and tilting the top (43) such as hydraulic pistons (44). FIG. 3 shows that the top (43) of the infeed table is lifted and tilted to move the stack of mats closer to the loading mechanism (40).

Figure 4:
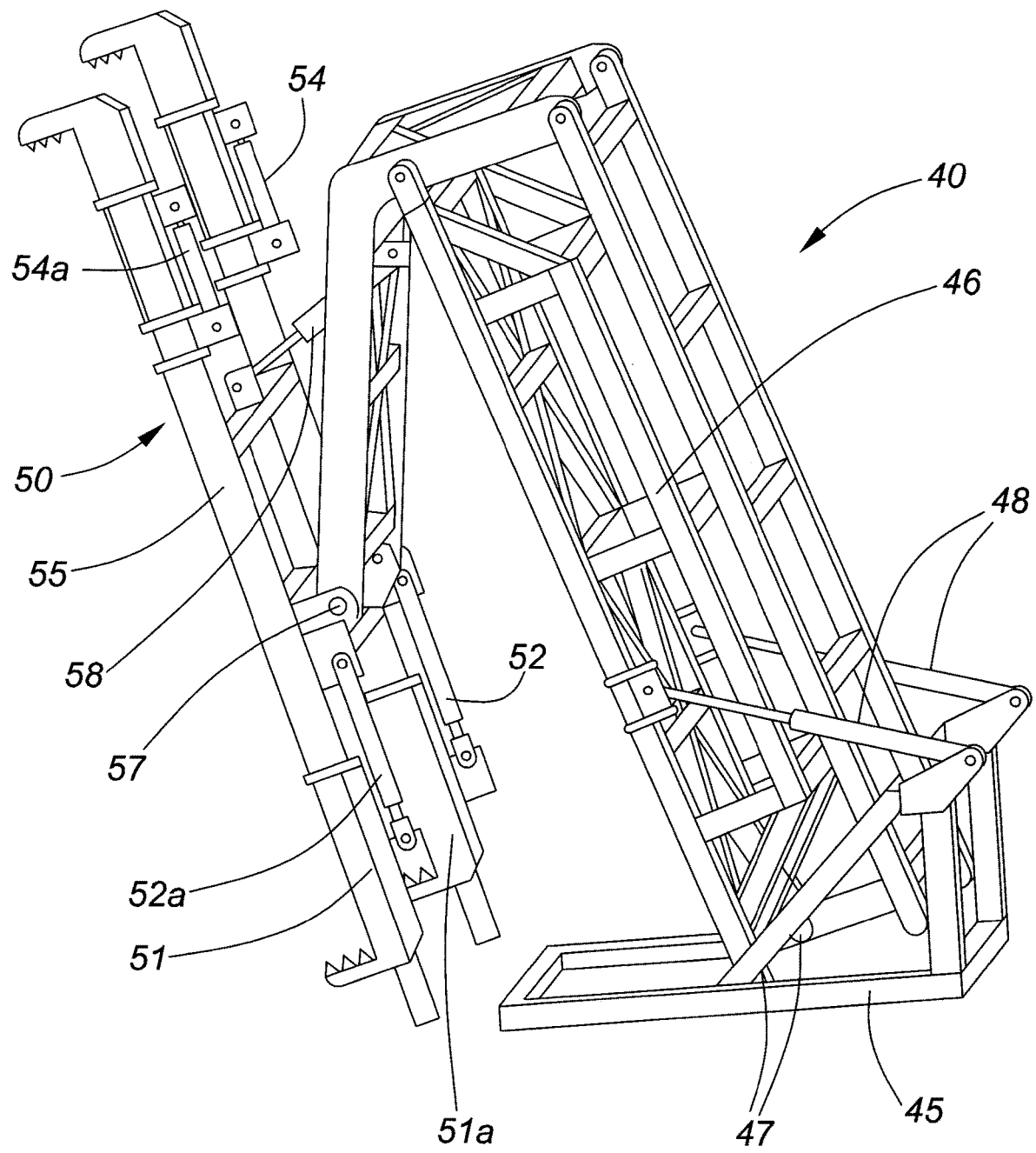
FIG. 4 is a side perspective view of the loading mechanism of the mat washing system according to a preferred embodiment of the present invention.

FIG. 4 shows an isolated view of the clamps (50) and the loading mechanism (40). The loading mechanism is an articulated frame comprising a base (45), a middle section (46) and a clamp section (50) comprising a pair of clamps (51, 51a) adapted to grasp the mat off of the infeed table (41) and position it onto at least one idle roller (22). The clamps (51, 51a) grasp the mat by its edges while the top (43) of the loading table (41) is tilted through the action of hydraulic pistons (44) and lifts a single mat off of the stack of mats resting on the table (41). The articulation of the loading mechanism (40) is accomplished through the use of pivot points (47) between the base of the loading mechanism and the middle section (48) as well as a pair of hydraulic pistons connecting the said base and middle section. To combined action of the pivot points and of the hydraulic pistons work in concert to accomplish the pivot motion. Similarly, the same concept is applied between the middle section (46) and the clamp section (50). Pivot points (57) between the middle section (46) of the loading mechanism and the clamp section

(50) as well as a pair of hydraulic pistons (58) connecting the middle section (46) and the clamp section (50) allow for the clamps to pivot and provide a greater range of motion to the loading mechanism. The clamps (51 and 51a) comprise two pairs of hydraulic pistons (52 and 54) each pair located at one end of the clamp frame (55). The clamps further comprise a gripper portion (62, 62a and 64, 64a) at each end of the clamp frame and slidable along the length thereof through the actuation of the hydraulic pistons (52, 52a and 54, 54a).

Similarly, the unloading system (60) comprises an articulated frame comprising a base, and middle section and a clamp system. The base section is preferably connected and/or mounted to the frame (10) of the system. The middle section consists of a pivotally movable sturdy frame connected to the base and having a range of motion sufficient to "lean in" towards the table of the outfeed station (5) to deposit the washed mat thereon.

Figure 5:
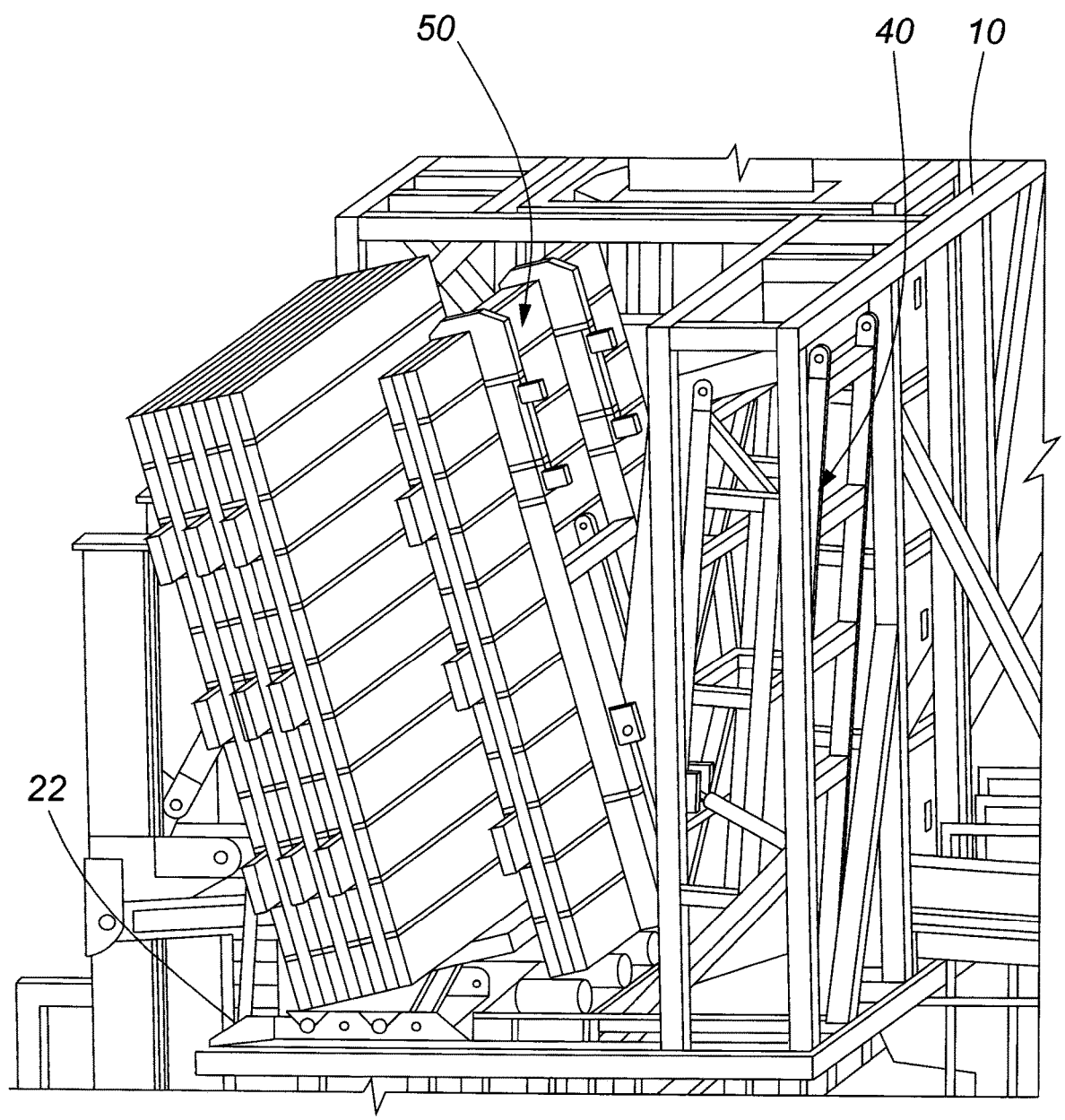
FIG. 5 is a side perspective view showing a mat being removed from the stack.
Figure 6:
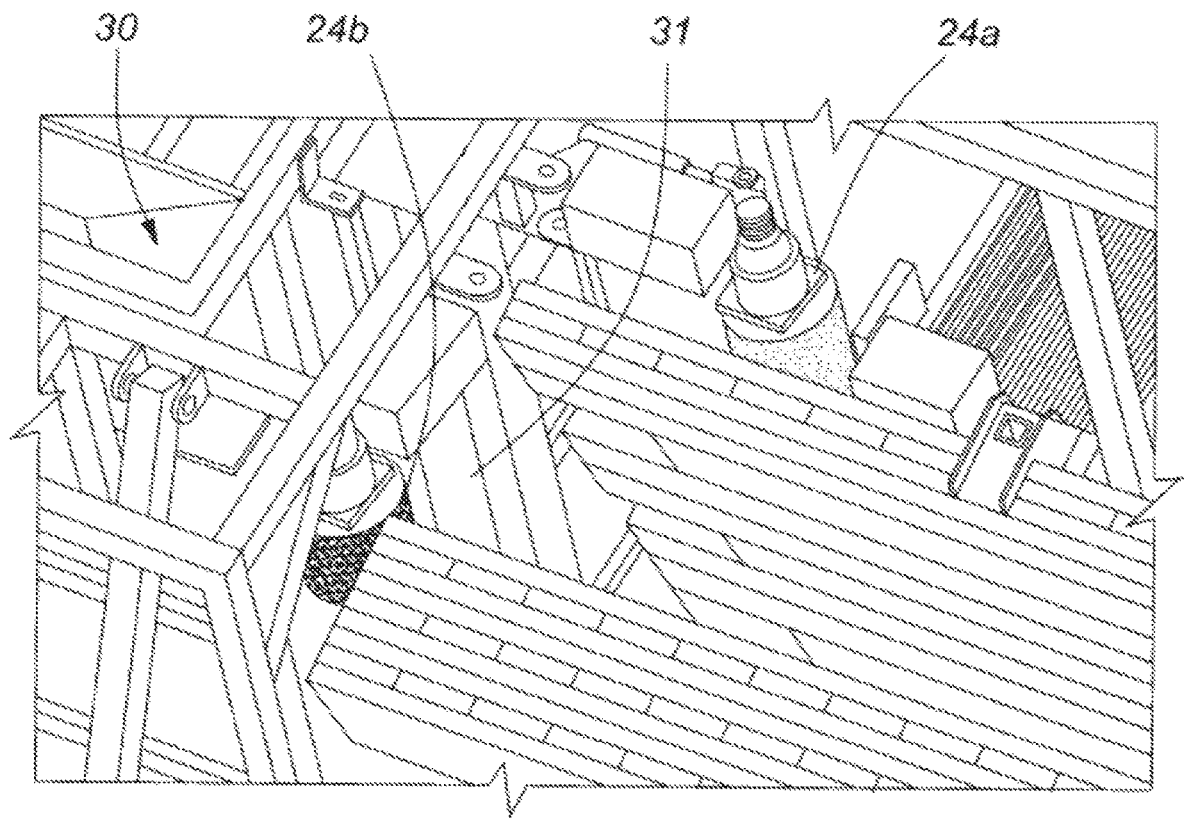
FIG. 6 is a top perspective view showing the drive rollers in an open position to allow the placement of a mat on the idle rollers.

FIG. 5 shows the loading mechanism (40) pulls one mat at a time from the stack, straightens and places them in-between the drive (feed) rollers (24a, 24b) in an "open" position as better illustrated in FIG. 6. In this preferred embodiment, the pair of feed rollers is in an "open" configuration to allow the mat to be placed in a position where, once the pair of rollers are in a "closed" configuration, each one of the feed rollers will be in frictional contact with opposite sides of the mat and will be capable of providing motion to the mat to enter into the wash chamber. The feed rollers "push" the mat into the wash chamber (30) and this is assisted by the idle rollers (22) on which the mat is positioned. Once through the wash chamber (30), a second pair of drive rollers (26a, 26b) will assist the first pair of drive rollers (24a, 24b) by "pulling" the mat.

Figure 7:
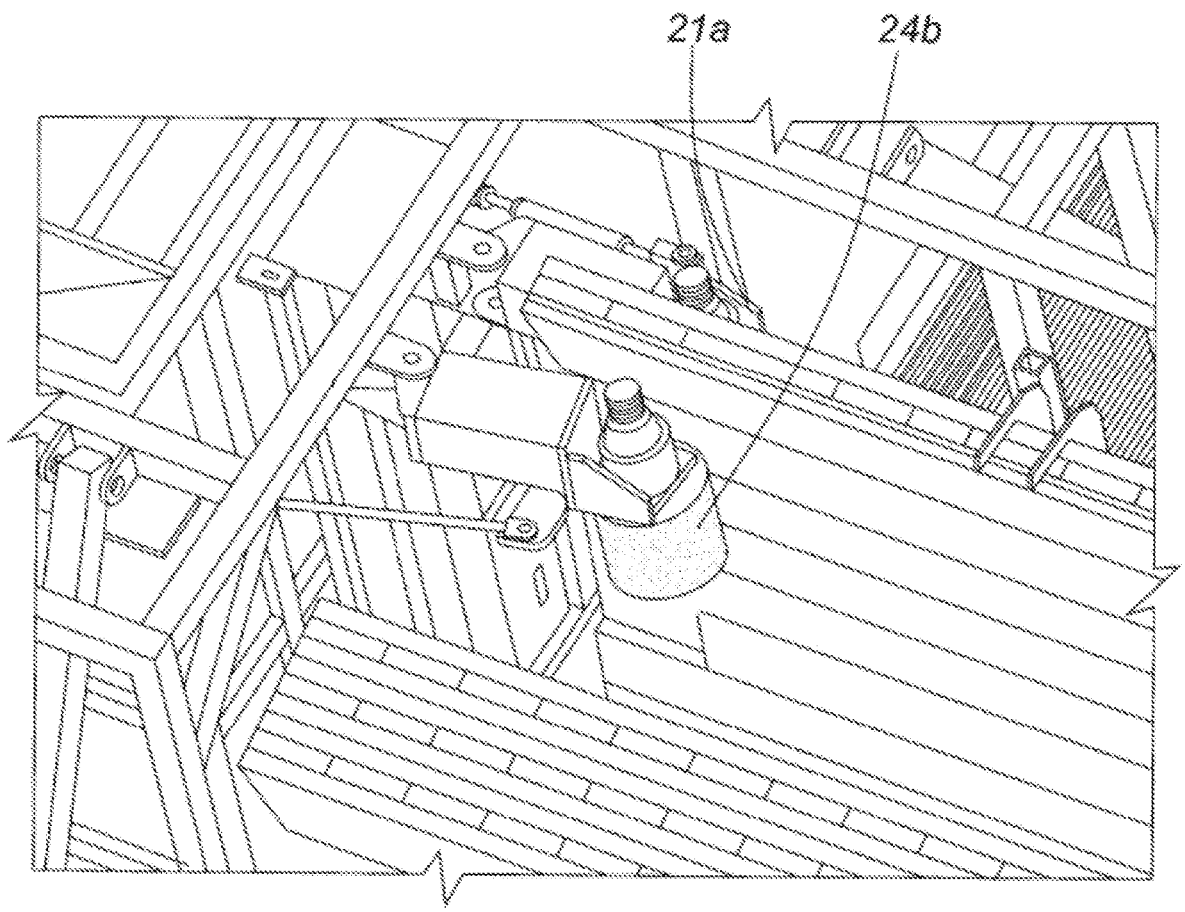
FIG. 7 is a top perspective view showing the drive rollers in a closed position after placement of a mat on the idle rollers.
Figure 8:
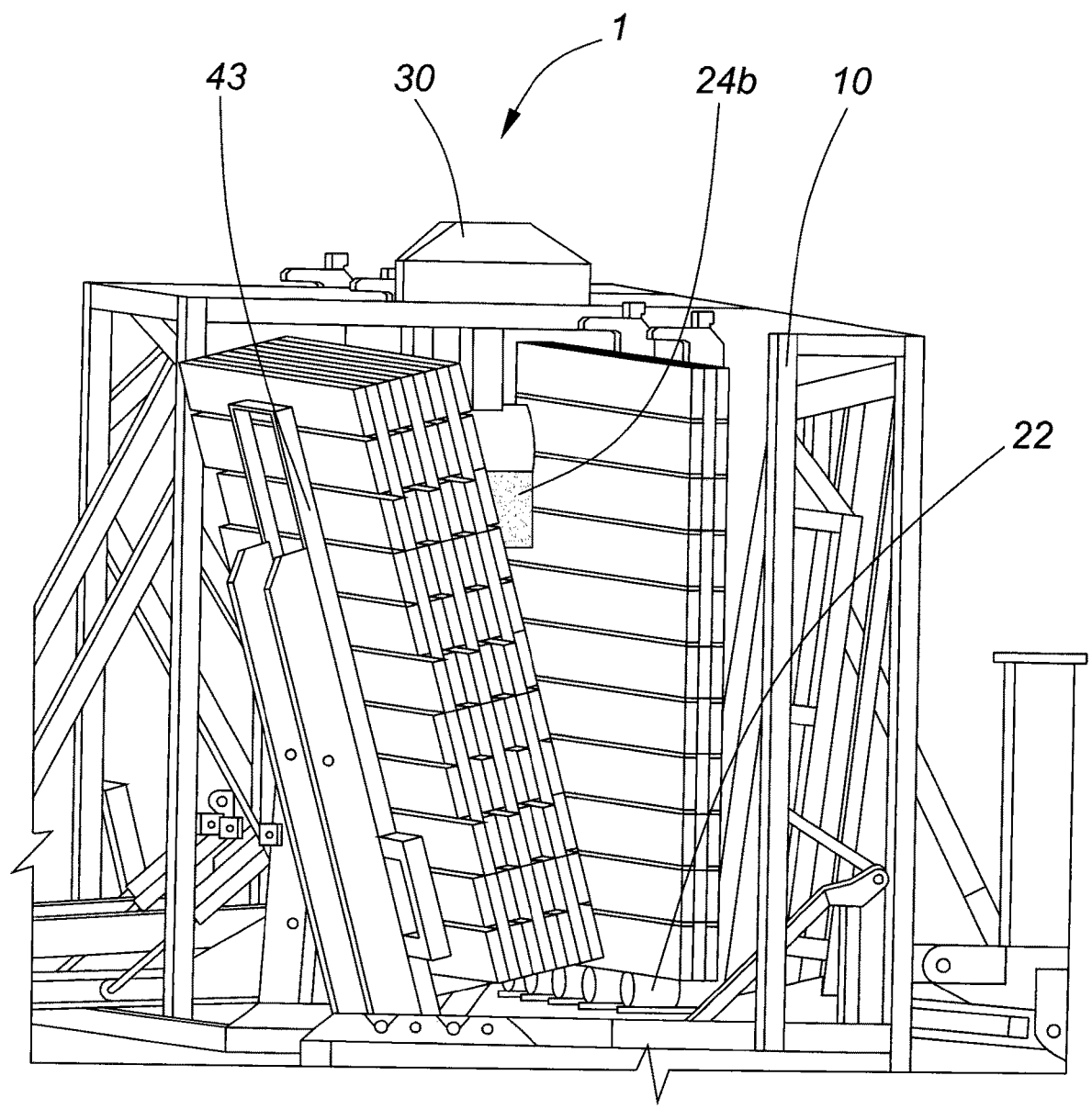
FIG. 8 is a front perspective view of a mat being positioned on the idler rollers of a system according to a preferred embodiment of the present invention.
Figure 9:
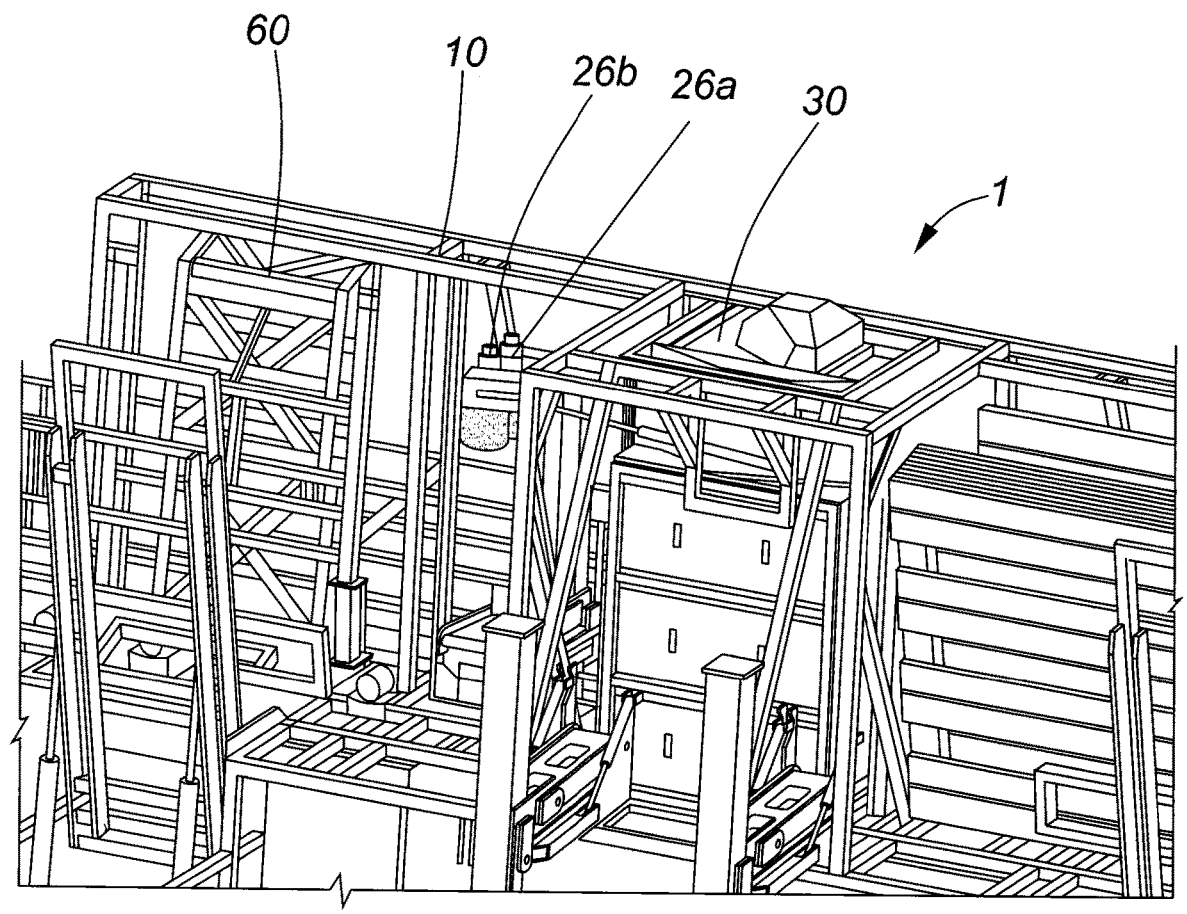
FIG. 9 is a side perspective view showing the drive rollers pinching a mat prior to the mat entering the wash station.

Once in position to be loaded onto the idle rollers (22), the mat is then straightened to a vertical position and lowered onto the idle rollers. The mat is then held in place by the drive rollers (24a, 24b) in a closed position while resting onto idle rollers (22) and then released from the infeed loading clamps (51, 51a), see FIGS. 7 and 8. The mat is now ready to be driven thru the wash chamber (30) where it will be grabbed by a second set of drive rollers (26a, 26b) that will pull it thru to the outfeed station (##) as best illustrated in FIG. 9. In this embodiment, the unloading station (outfeed station) (5) is identical to the infeed station (4) just running operations in reverse ending with a stack of clean mats on the outfeed table waiting for a forklift or loader to pick them up. The outfeed and infeed stations need not be identical but it may be desirable to have them be in order to optimize the speed of mat processing through the system. Preferably, infeed system (4) and outfeed system (5) are coordinated to allow the last mat to be washed while the infeed system is being reloaded.

According to an alternative embodiment of the present invention, the wash chamber does not contain any idle rollers. The absence of idle rollers within the chamber is compensated by proximity of the last roller to the entrance of the wash chamber and the proximity of the first roller outside the wash chamber as well as the drive rollers which exert sufficient pressure on the mat to maintain it straight as it enters and exits the wash chamber and is then supported on the rollers located at the exit of the chamber. This embodiment provides the ideal set-up as it maximizes the distance during which the cross-section of a mat is completely untouched by the system as it passes therethrough. The non-contact with the system ensures that, contrary to every other mat washer disclosed in the prior art, the present invention will allow a complete washing of a mat in one pass through. This point cannot be sufficiently emphasized as speed is an issue and cross-contamination (from dirty mats) are critical in the industry.

Figure 10:
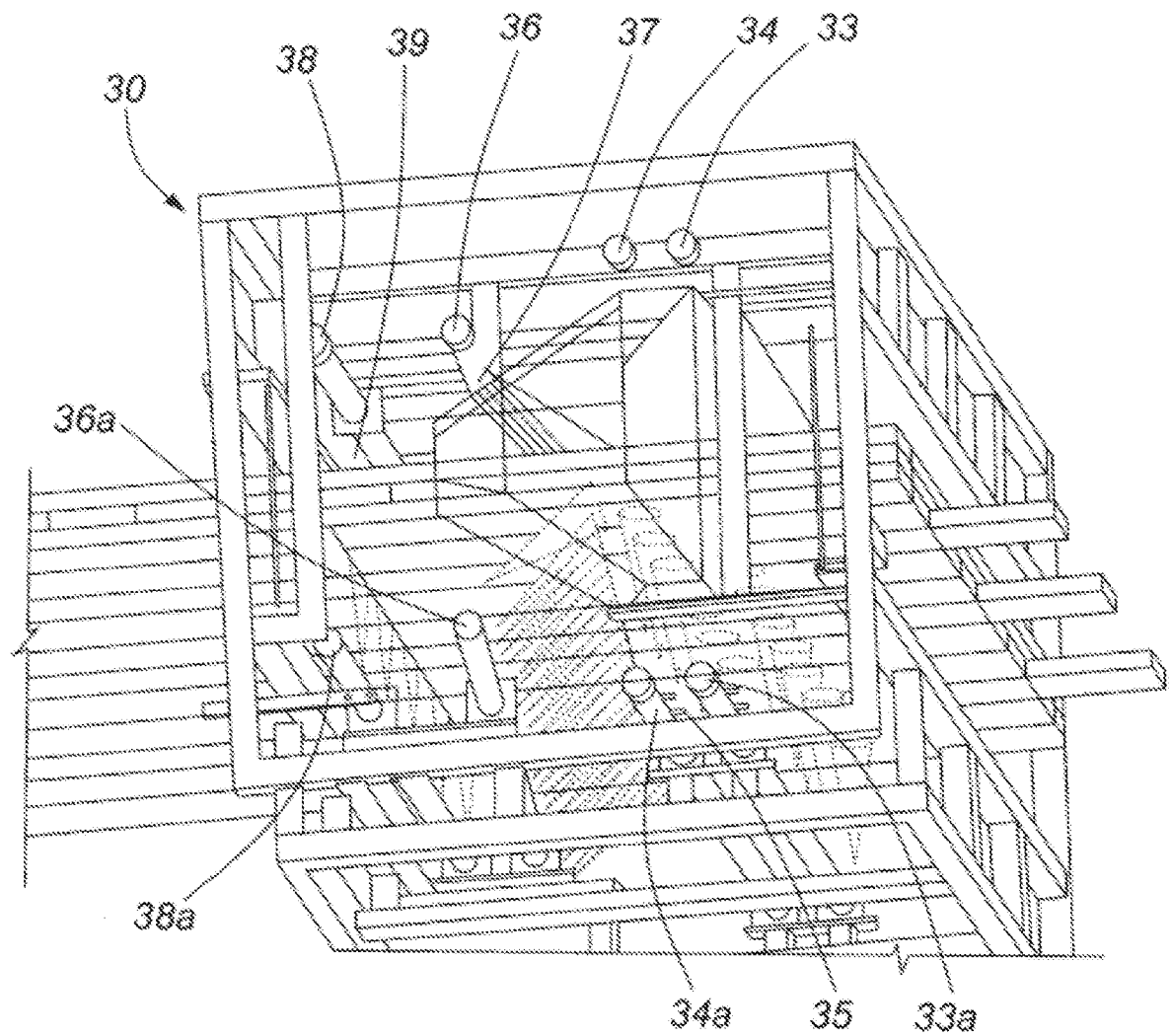
FIG. 10 is a top perspective view showing the wash chamber according to a preferred embodiment of the present invention with the covers removed.

FIG. 10 shows the inside of the wash chamber (30). The mat passes thru from right to left. The first series of nozzles are mounted on two towers (33, 33a and 34, 34a) on each side of the center of the wash chamber and each one of them containing a plurality of nozzles (35). Preferably, the two towers consist of staggered rows of rotary turbo nozzles (48 nozzles) that run at high pressure (2000 to 2500 psi) and a flow of about 3 gpm each. These are run by 4 separate pumps (not shown) that allow the operator to reduce or increase pressure individually as mats can be cleaner on one side than the other and grooves can be much harder to remove mud (and/or ice) from than faces. The second series of nozzles consists of a tower (36) of fan nozzles (37) (46 nozzles) located on either side of the center of the wash chamber (30) and running at a lower pressure (1000 to 1500 psi). These fan nozzles (37) are angled to flush all dirt and dirty water away from the clean mat as it makes its way to the exit of the wash chamber. Preferably, there are fan nozzles which aim water at the top edge of the mat, along the edge and top surface of the mat (as well as the edge and bottom surface), all along both the top and bottom surface of the mat and finally, on the bottom edge of the mat as well as the edge where the top of the mat and the edge of the mat meet (as well as the edge and the bottom of the mat meet). This ensures a thorough rinse of the mat and effective non-contact removal of dirt and debris from each mat. Finally, a pair of nozzle towers (38, 38a) contain a plurality of nozzles (39) to spray sanitizing bleach on the mats just before they exit the wash chamber. The combination of the various spray nozzle sequences allows a road mat to be washed without the use of brushes which can break down, wear down and/or damage the mats. This approach has not been seen in the industry as the school of thought emphasizes or focusses on contact cleaning and which type of brush to use and how to best set up a machine in order to obtain an optimal wash.

According to a preferred embodiment, there is rubberized canvas which surrounds the wash chamber (30) and which directs water into a water collecting means which is preferably a trough. The rubberized canvas surround is easily removable for cleaning any debris that collects on mechanical systems and collectors. Other options and material can be considered without departing from the purpose of such which is to maintain the water, dirt and debris within the wash chamber and have such drip into the through located right under said chamber.

Figure 11:
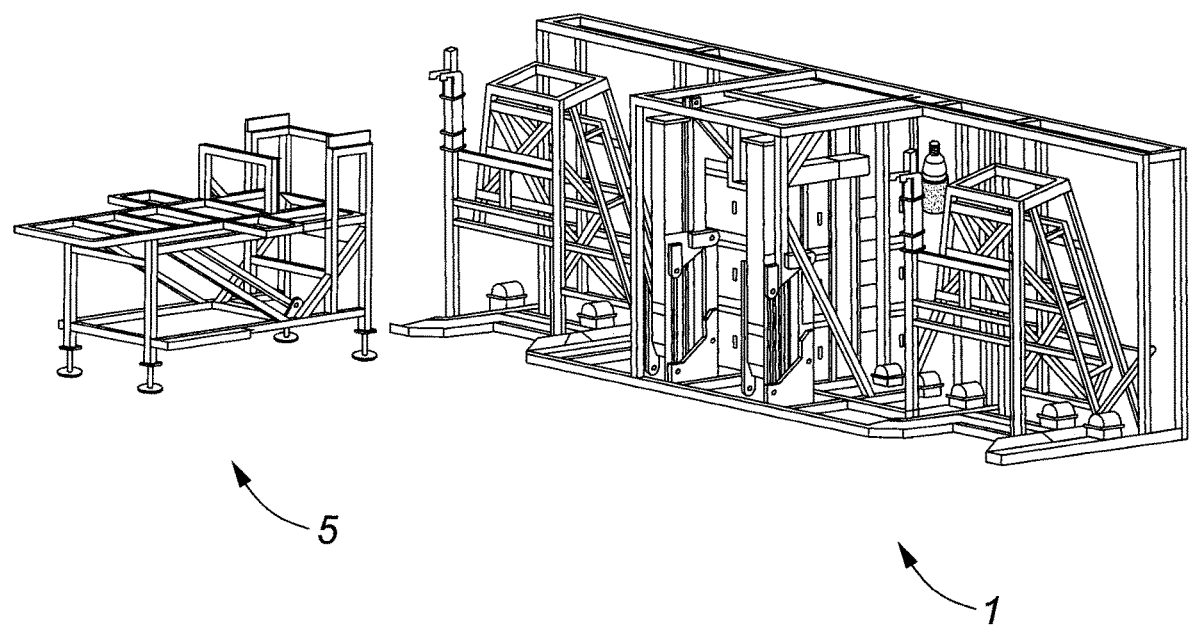
FIG. 11 is a perspective view of the mat washing system according to a preferred embodiment of the present invention with the infeed and outfeed tables removed and ready to be transported.

FIG. 11 shows the mat washer system (1) ready for transport. The top of the wash station (30) folds down, the outrigger legs (11) collapse and fold in and the infeed/outfeed tables unpin and remove.

Figure 12:
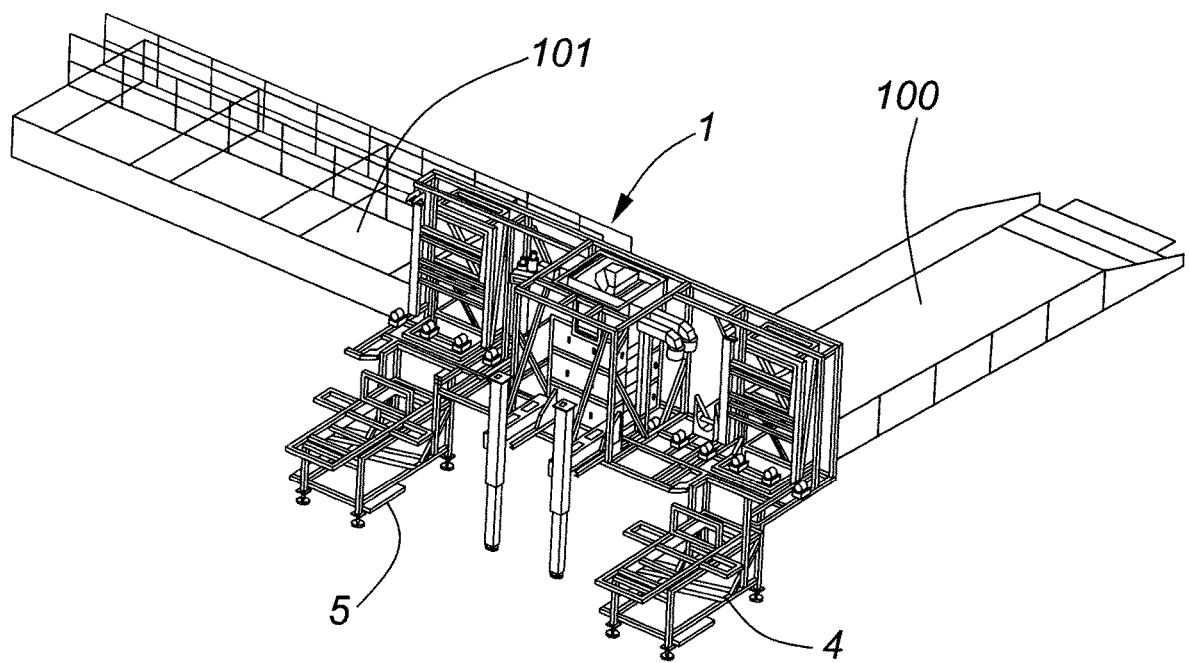
FIG. 12 is a perspective view of the mat washing system according to a preferred embodiment of the present invention in ready mode along with the water receiving tanks.

FIG. 12 shows the mat washing system (1) according to a preferred embodiment of the present invention in ready-mode along with two water-receiving (or recovery) tanks (100 and 101) located underneath the frame of the system.

According to a preferred embodiment of the present invention, the device for washing large flat objects recycles the water used in the washing of the mats and can be operated in remote areas without reliance on a fixed & unlimited water source or utility. This feature is not known to be part of known mat washing devices and limits their use in locations where large volume of water.

According to a preferred embodiment, the system further comprising at least one water collecting means to collect water used in washing the object. Preferably, the water collecting means is a trough located underneath the path of the object being washed and adapted to receive and collect the water dripping off the object. More preferably, the water collecting means further comprises a channel adapted to direct the collected water to a settling tank. According to a preferred embodiment, the system further comprises at least one water treatment means for treating the water collected by the collecting means.

The system to wash large flat objects according to a preferred embodiment of the present invention comprises a transport system; a washing section; a water supply and recirculation system; an object loading section and an object unloading section. Preferably, there is a section or a controller room where the system operation and monitoring is carried out. The water supply and recirculation system comprises a water tank capable of storing and providing water that has been trucked in for operations in a remote area. The water system further comprises a large channel located underneath the transport system in a position to recover water used in the process to wash the objects. The water captured in the channel is directed to a settling tank, in a preferred embodiment there are 6 settling chambers in total, where the dirt and other particulates are settled out and the water is further directed to a second settling tank which allows for further settling and clarifying of the water prior to it being filtered (optionally) and reintroduced in the water tank.

According to a preferred embodiment, the system is mounted on a tractor trailer.

According to another preferred embodiment, the system further comprises a closed loop water recirculation system. Preferably, the system further comprises a chemical spraying assembly to chemically treat the object to be washed, wherein said chemical spraying assembly is located after the washing chamber. More preferably, the system further comprises a separate chemical recovery system. Even more preferably, the separate chemical recovery system comprises a channel adapted to receive liquid dripping off the object. Preferably also, the separate chemical recovery system further comprises a chemical recovery vessel in fluid connection with said channel adapted to receive liquid dripping off the object.

According to a preferred embodiment, the system further comprising a tank supplying water and more preferably the water used in the washing process is recirculated into the tank which comprises a filtration system to remove suspended solids present in water prior to the water exiting the tank. Preferably, the filtration system is made up of a geotextile fabric.

In order to be of optimal efficiency, the system for washing large flat objects, according to a preferred embodiment of the present invention must adhere to transportation guidelines, it does so by having one height for transportation and one height for operation. In some cases, the operation height exceeds the transportation guidelines, therefore it is preferably that the that the system (or at least a portion thereof) be collapsible to meet such guidelines.

The person skilled in the art would understand that any attempt to circumvent the scope of the invention by adding a "contacting step" during the washing stage in order to overcome the non-contact as disclosed herein should be considered as an obvious variation of the present invention if such is done not in the spirit of washing mats in an efficient way but for the purpose of avoiding infringement.

The terms and descriptions used herein are set forth by way of illustration only and are not meant as limitations unless otherwise specifically indicated. Those skilled in the art will recognize that many variations are possible within the scope of the invention as defined in the following claims, and their equivalents, in which all terms are to be understood in their broadest possible sense unless otherwise specifically indicated. While the system shown and described in detail herein is fully capable of attaining the above-described aspects of the invention, the person skilled in the art will understand that it is but a preferred embodiment of the present invention and the invention is not to be limited to that singular embodiment.

The invention claimed is:

1. A system for washing a large flat object having a length greater than a width, the width defining a cross-section, said system comprising:
   a frame defining a longitudinal path and comprising
   a first end;
   a second end; and
   a wash chamber positioned between said first and second ends;
   a transport system secured to the frame and adapted to transport said object positioned thereon; said transport system comprising:
   a plurality of idle rollers located along said longitudinal path and adapted to support said object as it travels along the longitudinal path; and
   a drive system positioned in the first end and the second end to provide mechanical transport motion to said object along the longitudinal path from said first end of the frame to said second end of the frame, said drive system not being positioned within the wash chamber; and
   the first end comprising a loading mechanism to position the object on at least one of the plurality of idle rollers, and said second end comprising an unloading mechanism to remove the object from at least one of the plurality of idle rollers;
   said wash chamber comprising an entrance located proximate the first end and an exit located proximate the second end, and a first series of high pressure nozzles or water jets positioned within the wash chamber and adapted to spray said object when such is within the washing chamber.

2. A brushless system for washing a large flat object having a length greater than a width, the width defining a cross-section, said system comprising:
   a frame defining a longitudinal path and comprising
   a first end;
   a second end; and
   a wash chamber positioned between said first and second ends;
   a transport system secured to the frame and adapted to transport said object positioned thereon; said transport system comprising:
   a plurality of idle rollers located along said longitudinal path and adapted to support said object as it travels along the longitudinal path;
   a drive system positioned in the first end and the second end to provide mechanical transport motion to said object along the longitudinal path from said first end of the frame to said second end of the frame, said drive system not being positioned within the wash chamber; and
   the first end comprising a loading mechanism to position the object on at least one of the plurality of idle rollers, and said second end comprising an unloading mechanism to remove the object from at least one of the plurality of idle rollers;

said wash chamber comprising an entrance located proximate the first end and an exit located proximate the second end, and at least one plurality of high pressure nozzles or water jets positioned within the wash chamber and adapted to spray the entire surface of said object when such is within the washing chamber.

3. A brushless system for washing a large flat object having a length greater than a width, the width defining a cross-section, said system comprising:
a frame defining a longitudinal path and comprising
a first end;
a second end; and
a wash chamber positioned between said first and second ends;
a transport system secured to the frame and adapted to transport said object positioned thereon; said transport system comprising:
a plurality of idle rollers located along said longitudinal path and adapted to support said object as it travels along the longitudinal path;
a drive system positioned in the first end and the second end to provide mechanical transport motion to said object along the longitudinal path from said first end of the frame to said second end of the frame, said drive system not being positioned within the wash chamber; and
the first end comprising a loading mechanism to position the object on at least one of the plurality of idle rollers, and said second end comprising an unloading mechanism to remove the object from at least one of the plurality of idle rollers;
said wash chamber comprising an entrance located proximate the first end and an exit located proximate the second end, and at least one series of a plurality of high pressure nozzles or water jets positioned within the wash chamber and adapted to spray the entire surface of said object when such transits through the washing chamber;
wherein the entire cross-section of said object is untouched by the drive system at at least one point during its transit through the wash chamber.

4. The system according to claim 1, wherein the large flat object is positioned on its side along an edge thereof.

5. The system according to claim 1, wherein the drive system comprises a pair of opposing drive rollers adapted to frictionally engage said object and drive the object into the wash chamber.

6. The system according to claim 1, wherein the drive system comprises a second pair of opposing drive rollers adapted to frictionally engage said object after a portion thereof exits the wash chamber and pull the object out of the wash chamber.

7. The system according to claim 5, wherein the pair of drive rollers are mounted on the frame proximate the entrance of the wash chamber.

8. The system according to claim 5, wherein at least one of the rollers of the pair of drive rollers is pivotally mounted on the frame to allow movement between a first position which allows room for insertion of the object onto the transport system and a second position where the two rollers are in frictional contact with the object.

9. The system according to claim 1, further comprising a second series of high pressure nozzles or water jets located within the wash chamber in a position after the first series of high pressure nozzles or water jets.

10. The system according to claim 9, further comprising a third series of high pressure nozzles or water jets located within the wash chamber in a position after the second series of high pressure nozzles or water jets.

11. The system according to claim 1, wherein a loading support further comprises hydraulic cylinders to move said loading support from a horizontal position to a substantially vertical position.

12. The system according to claim 1, further comprising an unloading support located at the second end of the frame to receive the washed object.

13. The system according to claim 12, wherein the unloading support comprises a frame pivotally movable about an axis to move from a substantially vertical position to a substantially horizontal position.

14. The system according to claim 1, further comprising at least one water collecting means to collect water used in washing the object.

15. The system according to claim 14, wherein the water collecting means is a trough located underneath the path of the object being washed and adapted to receive and collect the water dripping off the object.

16. The system according to claim 14, further comprising a settling tank, wherein the water collecting means further comprises a channel adapted to direct the collected water to a settling tank.

17. The system according to claim 14, further comprising at least one water treatment means for treating the water collected by the water collecting means.

18. The system according to claim 14, further comprising a closed loop water recirculation system.

19. The system according to claim 1, further comprising a chemical spraying assembly to chemically treat the object after the object has been washed, wherein said chemical spraying assembly is located proximate the exit of the wash chamber.

20. The system according to claim 19, further comprising a chemical recovery means and a water collecting means, said chemical recovery means being separate from the water collecting means.

21. The system according to claim 20, wherein said separate chemical recovery means comprises a channel adapted to receive chemical containing fluid dripping off the object.

22. The system according to claim 21, wherein said separate chemical recovery means further comprise a chemical recovery vessel in fluid connection with said channel adapted to receive liquid dripping off the object.

23. The system according to claim 1, further comprising a tank supplying water used in washing of the object, the tank comprising a filtration system to remove suspended solids present in water prior to the water exiting the tank.

24. The system according to claim 23, wherein said filtration system comprises a geotextile fabric.

25. A method for contact-free washing of a large flat object, said method comprising:
providing a system for washing a large flat object according to claim 1;
providing a large flat object;
loading said object onto the system;
securing said object onto the transport system by frictionally engaging opposing drive rollers to a portion of the object;
transporting the object through the wash chamber;
striking the entire surface area of the object with high pressure fluid jets; and
retrieving the object from the wash chamber.

26. A method for contact-free washing of a large flat object, said method comprising:

providing a system for washing a large flat object according to claim 2;
providing a large flat object;
loading said object onto the system;
securing said object onto the transport system by frictionally engaging opposing drive rollers to a portion of the object;
transporting the object through the wash chamber;
striking the entire surface area of the object with high pressure fluid jets; and
retrieving the object from the wash chamber.

27. A method for contact-free washing of a large flat object, said method comprising:
providing a system for washing a large flat object according to claim 3;
providing a large flat object;
loading said object onto the system;
securing said object onto the transport system by frictionally engaging opposing drive rollers to a portion of the object;
transporting the object through the wash chamber;
striking the entire surface area of the object with high pressure fluid jets; and
retrieving the object from the wash chamber.

* * * * *